US009055088B2

(12) United States Patent  
Barsuk

(10) Patent No.: US 9,055,088 B2  
(45) Date of Patent: Jun. 9, 2015

(54) MANAGING A COMMUNICATION SESSION WITH IMPROVED SESSION ESTABLISHMENT

(75) Inventor: Vyacheslav Barsuk, Longmont, CO (US)

(73) Assignee: International Business Machines Corporation, Armonk, NY (US)

( * ) Notice: Subject to any disclaimer, the term of this patent is extended or adjusted under 35 U.S.C. 154(b) by 3297 days.

(21) Appl. No.: 11/081,065

(22) Filed: Mar. 15, 2005

(65) Prior Publication Data

US 2006/0212587 A1  Sep. 21, 2006

(51) Int. Cl.
*H04L 29/08* (2006.01)

(52) U.S. Cl.
CPC ..................... *H04L 67/14* (2013.01)

(58) Field of Classification Search
None
See application file for complete search history.

(56) References Cited

U.S. PATENT DOCUMENTS

| | | | | |
|---|---|---|---|---|
| 6,636,503 | B1 * | 10/2003 | Shiran et al. | 370/352 |
| 6,850,982 | B1 * | 2/2005 | Siegel | 709/227 |
| 6,975,647 | B2 * | 12/2005 | Neale et al. | 370/466 |
| 7,003,798 | B2 * | 2/2006 | Yamakawa et al. | 726/11 |
| 7,328,267 | B1 * | 2/2008 | Bashyam et al. | 709/227 |
| 7,398,292 | B2 * | 7/2008 | Ramanathan et al. | 709/203 |
| 2001/0042200 | A1 | 11/2001 | Lamberton et al. | 713/151 |
| 2001/0056476 | A1 * | 12/2001 | Benayoun et al. | 709/218 |
| 2002/0078135 | A1 | 6/2002 | Venkatsubra | 709/202 |
| 2002/0087888 | A1 * | 7/2002 | Yamakawa et al. | 713/201 |
| 2002/0120743 | A1 * | 8/2002 | Shabtay et al. | 709/226 |
| 2002/0188753 | A1 | 12/2002 | Tang et al. | 709/237 |
| 2003/0037164 | A1 | 2/2003 | Chaar et al. | 709/237 |
| 2003/0065950 | A1 | 4/2003 | Yarborough | 713/201 |
| 2003/0088677 | A1 * | 5/2003 | Yamamoto | 709/227 |
| 2003/0101273 | A1 | 5/2003 | Hensbergen | 709/232 |
| 2003/0118049 | A1 | 6/2003 | Bender | 370/466 |
| 2003/0182580 | A1 | 9/2003 | Lee | 713/201 |
| 2003/0204621 | A1 | 10/2003 | Poletto et al. | 709/239 |
| 2003/0212999 | A1 | 11/2003 | Cai | 725/119 |
| 2004/0039774 | A1 | 2/2004 | Xu | 709/203 |
| 2004/0088407 | A1 | 5/2004 | Boyd et al. | 709/224 |
| 2005/0198311 | A1 * | 9/2005 | Smith et al. | 709/227 |
| 2006/0020707 | A1 * | 1/2006 | Undery et al. | 709/230 |
| 2006/0031520 | A1 * | 2/2006 | Bedekar et al. | 709/227 |
| 2006/0168260 | A1 * | 7/2006 | Hinde et al. | 709/229 |
| 2008/0056494 | A1 * | 3/2008 | Jacobson et al. | 380/255 |
| 2008/0209490 | A1 * | 8/2008 | Dankworth et al. | 725/112 |

* cited by examiner

*Primary Examiner* — Backhean Tiv
(74) *Attorney, Agent, or Firm* — Yee & Associates, P.C.; Lisa J. Ulrich

(57) ABSTRACT

System, method and program product for managing sessions. A request to open a session with a destination server is received. A determination is made whether an operational request is received concurrently with the open request or within a predetermined time thereafter. If so, the requested session is opened. If not, the requested session is not opened. The method can be performed by a proxy server. To initiate the session, the operational request should be received concurrently with the open request or within a predetermined time thereafter. The destination server is responsible for processing the operational request. To open the session with the destination server from the proxy server, an open request and the operational request are sent from the proxy server to the destination server. An inbound socket of the proxy server associated with the session is spliced to an outbound socket of the proxy server associated with the session. Consequently, subsequent requests in this session are automatically passed from the inbound socket to the outbound socket. The outbound socket is used for the session with the destination server.

20 Claims, 5 Drawing Sheets

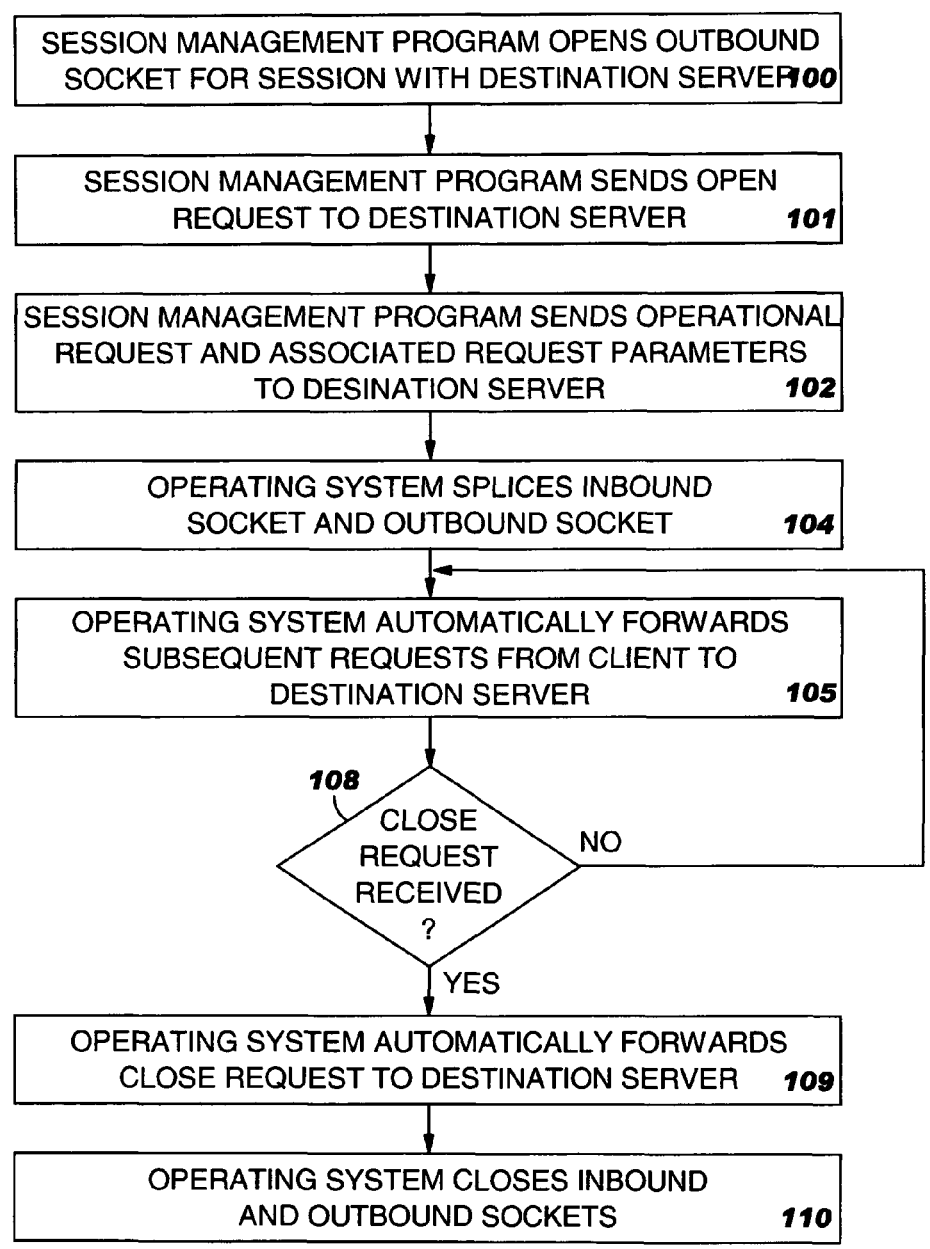

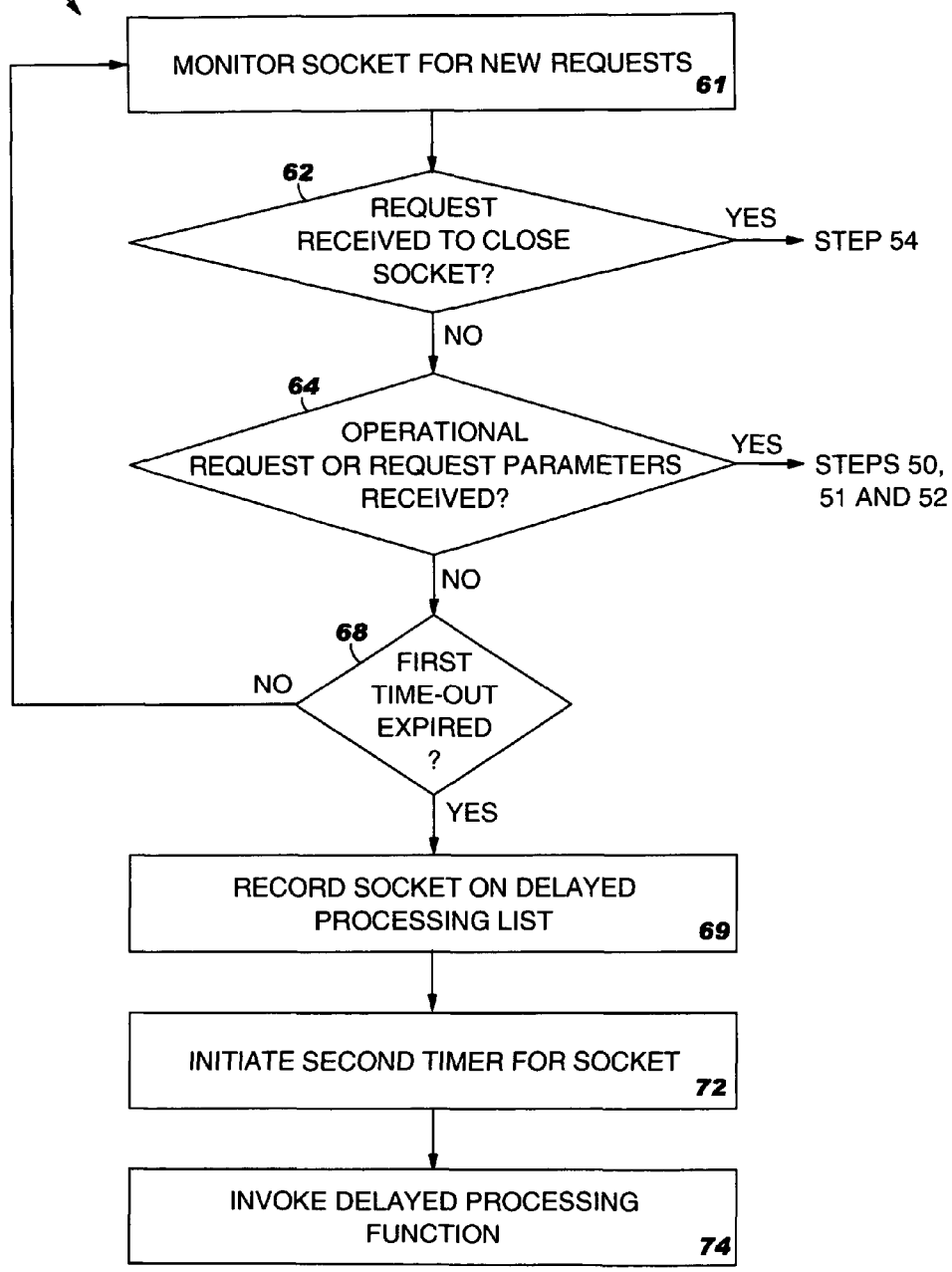

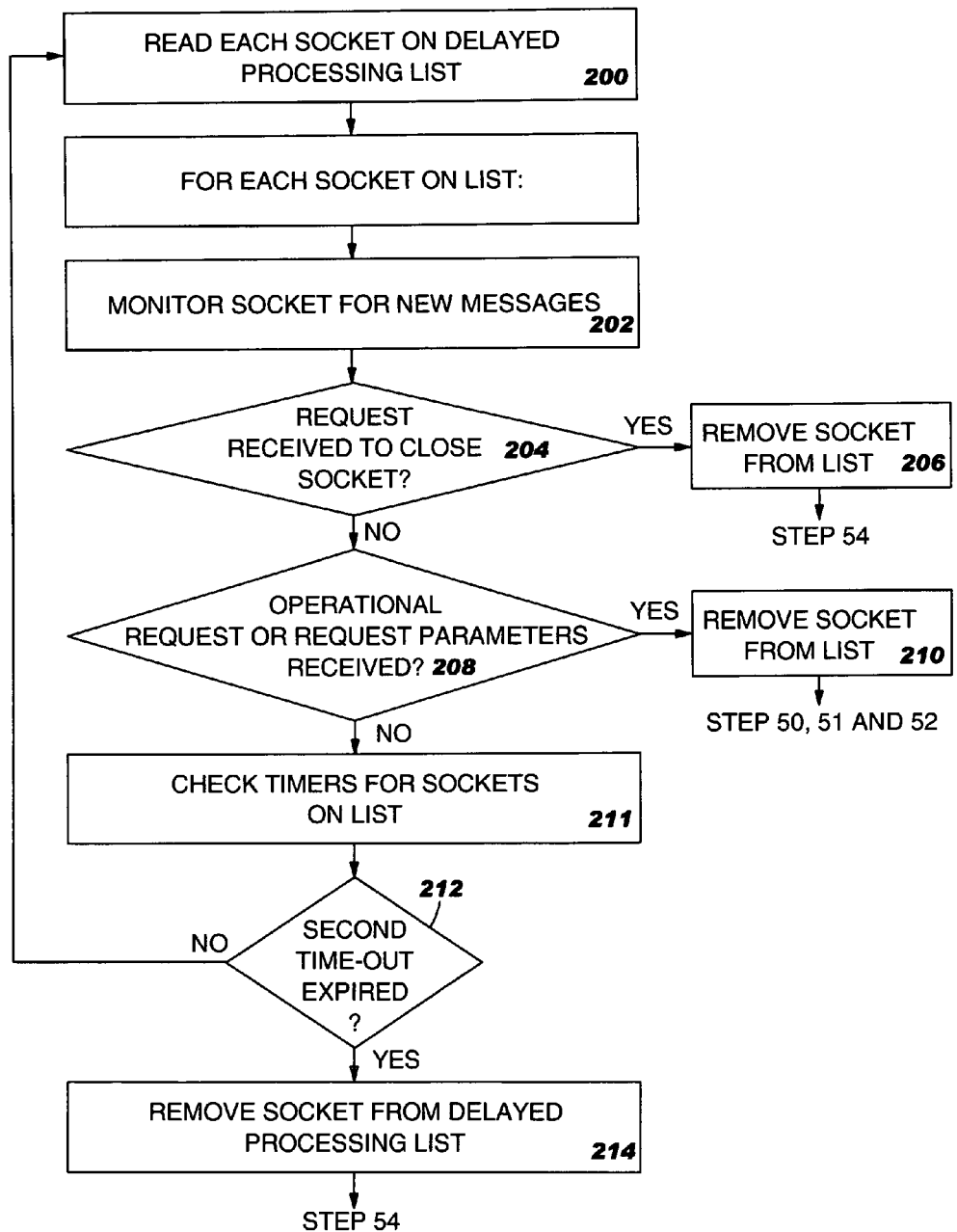

MANAGING A COMMUNICATION SESSION WITH IMPROVED SESSION ESTABLISHMENT

BACKGROUND OF THE INVENTION

The invention relates generally to computer systems, and more particularly to a technique to manage a communication session.

It is known for two computers to establish a communication "session" between themselves and then communicate with each other in the session using TCP protocol. A "session" is an association of facilities necessary for establishing, maintaining and releasing connections for communication between two computers. For example, each computer typically assigns a message inbound socket and a message outbound socket for the session. A "socket" is a combination of IP address and port. To establish the session, an initiating computer typically sends a request to a destination computer to "open" the session, such as a standard TCP function connect. (The open request can be sent to an IP address and port of the server.) The destination computer which performs server functions listens for requests on a particular socket. That request is handled by the operating system. From the operating system standpoint that socket is a passive socket and it is function of the operating system to accept incoming connections requests on it. Upon receipt of a new open (connection) request, the operating system within the destination computer will determine that this is a request for a new session and put the request into a queue. All those connections/sessions are considered incomplete until an application program on the destination computer issues a TPC function "accept" to get the connection request from the queue and complete the connection. The destination computer operating system keeps track of all subsequent requests within the session which is established. The destination computer will also assign an unused outbound socket for all responses to the initiating computer for this session. The destination computer will also send to the initiating computer an acknowledgment (with the session ID) to indicate that the session request has been accepted. The initiating computer will use a socket which it previously assigned to this session to receive the acknowledgment. After receipt of the acknowledgment, the initiating computer can send to the destination computer an operational request (with the session ID) to read or write data, access a web application or for another service. In the case of a read request, the operational request typically includes an identity (or address range) of a file to be read. In the case of a write request, the operational request typically includes an identity (or address range) of a file to be written and data to be written to the file in the destination computer. In the case of a read request, the destination computer will typically respond to the initiating computer with the requested data, and in the case of a write request, the destination computer will typically respond to the initiating computer with an acknowledgment that the data has been successfully written. After the requested operation is completed and the initiating computer has no more requests for this session, the initiating computer will typically send a request to the destination computer to "close" the session. The "close" request can be recongnized by recieving s special error code when attempting to perform an I/O operation within the session, i.e. inability to perform further reading because the socket is closed. Upon receipt of the "close" request, the destination computer will delete the session ID from its list of active sessions and terminate the assignment of its inbound and outbound sockets to this session so that these inbound and outbound sockets can be used for other sessions. Also, after closing the session, the destination computer will typically send an acknowledgment to the initiating computer that the session has been closed. At such time, the initiating computer will delete the session ID from its list of active sessions and terminate the association of its inbound and outbound sockets to the session so they can be used for another session.

In a client/server arrangement, typically the client is the initiating computer and the server is the destination computer. The client initiates the session to obtain a service from the server, such as to read data which has been backed up or otherwise stored by the server, to backup data or otherwise store data at the server or to request a service by an application hosted by the server. Such services may include web services, or any other TCP service such as remote database connectivity. In the case where the destination server hosts a web or other application, there may be a proxy server which receives the client request on behalf of the destination server and forwards the client request to the destination server which provides the requested service.

In most cases, the open request, associated operational request with request parameters (for example, in the case of a read request the identity or address range of a file to be read, in the case of a write request the identity or address of a file to be written and the data to be written, in the case of a request for a web application, the URL or other address of a web page representing the interface to the application, and in the case of a database remote connect request, database response and associated close request are sent in separate messages. In addition, if the data of a write request is lengthy, multiple messages may be required to transfer the data. However, in other cases where the communication protocol permits and the amount of data to be written is short or in the case of another operational request which does not require transmission of lengthy data, the "open" request, associated operational request with request parameters and associated "close" request may all be sent in one message.

A problem with known systems is that a destination computer often receives an "open" request in one message, but not any related operational request or request parameters in the same or subsequent message. This may be caused by a legitimate problem with the initiating computer or communication path between the initiating computer and destination computer or by a malicious denial of service attack. In such cases, the destination computer incurs the overhead of opening the session and "ties-up" two sockets, but accomplishes nothing productive. A large number of such unproductive open requests can seriously burden the destination computer and degrade the response time to productive requests.

Accordingly, an object of the present invention is to better manage sessions to avoid the foregoing problem.

SUMMARY OF THE INVENTION

The invention resides in a system, method and program product for managing sessions. A request to open a session with a destination server is received. A determination is made whether an operational request is received concurrently with the open request or within a predetermined time thereafter. If so, the requested session is opened. If not, the requested session is not opened.

According to features of the present invention, the method is performed by a proxy server, the operational request is received concurrently with the open request or within a predetermined time thereafter, and the destination server is responsible for processing the operational request. An open request and the operational request are sent to the destination server. An inbound socket of the proxy server associated with the session is spliced to an outbound socket of the proxy server associated with the session. Consequently, subsequent requests in this session are automatically passed from the inbound socket to the outbound socket. The outbound socket is used for the session with the destination server.

DETAILED DESCRIPTION OF THE PREFERRED EMBODIMENTS

Figure 1:
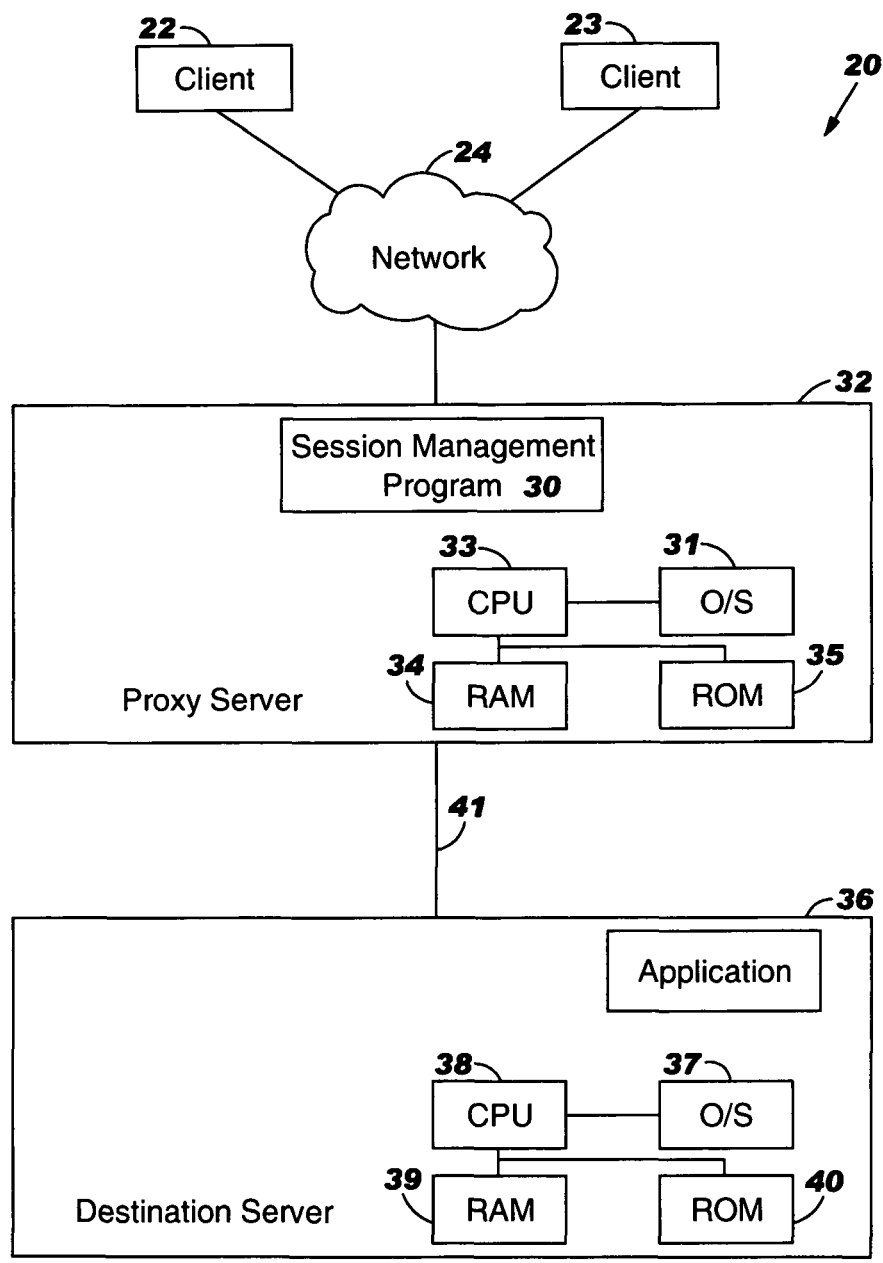
FIG. 1 is a block diagram illustrating a computer system which includes the present invention.

The present invention will now be described in detail with reference to the figures. FIG. 1 illustrates a computer system generally designated 20 in which the present invention is incorporated. System 20 comprises known types of clients 22 and 23, a known type of network 24, a known type of hardware and operating system within a proxy server 32, a session management program 30 according to the present invention which resides on and executes in proxy server 32, and a known type of destination server 36. The proxy server 32 includes a known operating system 31, CPU 33, RAM 34 and ROM 35. By way of example, the operating system 31 can be an AIX or UNIX (tm licensed by X/OPEN Group LTD), Linux (tm of Linus Torvalds) or Solaris (tm of Sun Microsystems) operating system. The destination server 36 includes a known operating system 37, CPU 38, RAM 39 and ROM 40. By way of example, the operating system 37 can be AIX or UNIX (tm licensed by X/OPEN Group LTD), Linux (tm of Linus Torvalds) or Solaris (tm of Sun Microsystems) operating system. Operating system 37 includes a known function to open and close sessions.

In the illustrated example, the clients 22 and 23 are known workstations executing known web browsers, and the workstations are interconnected to the proxy server 32 via the Internet 24. Also in the illustrated example, the web browsers address the proxy server 26 using a URL. The proxy server 32 maintains a list of which destination servers execute which applications. The URL also includes an identifier which indicates destination server 36 as the server which hosts the application to provide to the client the requested service. The identifier can be an end portion of the URL which identifies the requested application. In other embodiments of the present invention, the destination server 36 provides other types of services to the client, and can be addressed by known addressing schemes other than a URL, such as database connectivity, LDAP or Java applet/servlet. The destination server 36 can be coupled to the proxy server 32 via an intranet or other network 38.

In the illustrated embodiment, the session management program 30 is logically interposed between the requesting client 22 or 23 and the destination server 36, and receives the open request and operational requests with request parameters from the client, before they can be passed to the destination server 36. Moreover, in the illustrated embodiment, the session management program 30 is logically interposed between the requesting client and the operating system function within proxy server 32 which normally forwards client requests to the destination server 36. As explained in more detail below, the session management program 30 will not permit an open request to pass to the destination server 36 unless and until the client sends an associated operational request or request parameters. Consequently, the destination server 36 avoids the overhead of opening a session (and tying up sockets) that may not yield a productive result. Once the client sends an operational request or request parameters in the same session as the open request, the session management program 30 deems the session productive, establishes a session with the destination server, and "splices" the inbound socket of the proxy server to an outbound socket of the proxy server which is used for the session with the destination server. Once "spliced", subsequent requests from the client for this session proceed automatically to the outbound socket of the proxy server without review by the session management program 30. Thus, the splicing avoids further overhead or delays in the proxy server. If the associated operational request or request parameters are not received within a time window, then the socket used to receive the open request in the proxy server is freed-up, and no session is established between the proxy server and the destination server for this open request. Consequently, no session is established at the destination server for the original open request.

If the infrastructure does not require a proxy server 32, the session management program 30 can reside on and execute directly in the destination server 36 or on a designated server before destination server 36. In such a case, the session management program 30 will be logically interposed between the requesting client 22 or 23 and the operating system function within the destination server which opens sessions. In such a case, the session management program 30 will receive the open request, operational requests with request parameters and associated close request from the client, before they can be passed to this operating system function or requested application in the destination server. The session management program 30 will not permit an open request to be processed by this operating system function and application within the destination server unless and until the client sends an associated operational request or request parameters. Consequently, the destination server 36 avoids the overhead of opening a session that will not yield any productive result. If no operational request or request parameters are sent with a time window, then the socket on which the open request was received at the destination server is freed-up, and no session is opened at the destination server.

Figure 2A:
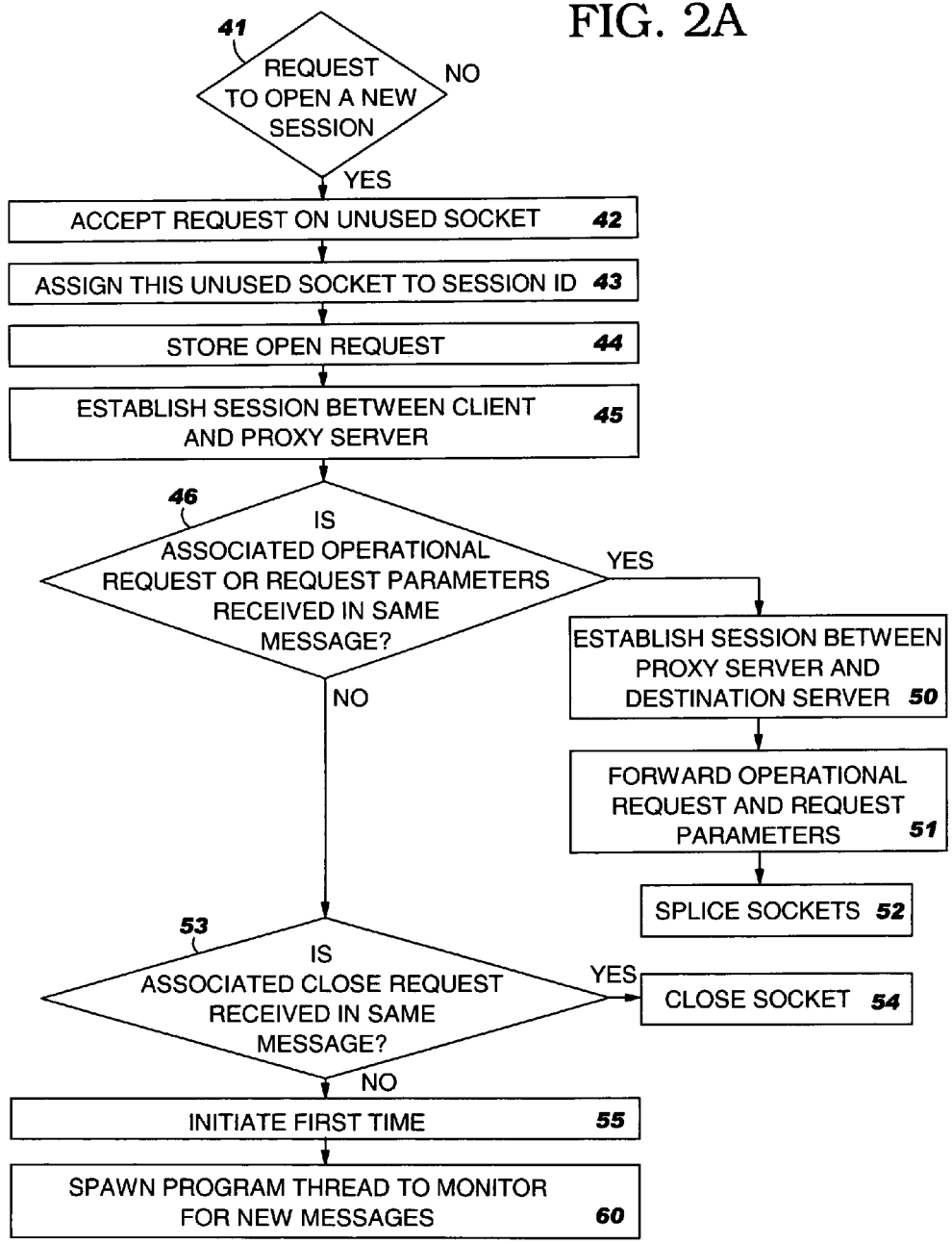
FIG. 2 (A-D) form flow chart illustrating function and operation of a session management program within a proxy server of FIG. 1, according to the present invention.

FIG. 2 (A-D) illustrate the function and operation of the session management program 30 executing in proxy server 32 in more detail. In FIG. 2(A), the session management program 30 waits for arrival of a request to open a session (step 41). Such a request will be part of a message and have a new session ID. When such a request arrives, (for example from client 22) the session management program 30 accepts the connection on a passive socket (step 42), assigns this socket to the session ID of the open request (step 43), and stores the open request (step 44). Then, session management program 30 establishes a session between client and proxy server (step 45). Next, the session management program 30 determines if there is some "data" that may be an operational request (i.e. a command), request parameters or request data contained in the same message as the open request (decision 46). At this point, in one embodiment of the present invention, the session management program 30 can perform further analysis to determine if the "data" is in fact a valid operational request and/or request parameters. (In another embodiment of the present invention, the session management program 30 does not determine if the "data" is in fact a valid operational request and/or request parameters. This determination is left to the application responsible for handling the request.) If so, then the session management program 30 establishes a session between the destinatination server and the proxy server (step 50). After the server acknowledges the establishment of the session with the client, the session management program forwards the operational request and associated request parameters to the destination server (step 51) and then splices the inbound and outbound sockets of the proxy server 32 (step 52).

Steps 50, 51 and 52 are illustrated in more detail in FIG. 2(B) and described in more detail as follows. In step 100, the session management program 30 opens an outbound socket within the proxy server 32 for a session with the destination server 36. Then, the session management program 32 sends the open request stored in step 44 to the destination server 36 (step 101). In response, the destination server 36 will open the session with the proxy server 32. Then, the session management program 32 sends to the destination server in this session, the associated operational request and request parameters, received from the client (step 102). Then, the session management program 32 "splices" the incoming socket of the proxy server 32 (from which the proxy server 32 received the open request and associated operational request and request parameters to the outbound socket of the proxy server 32 (from which the proxy server sent the open request and associated operational request and request parameters, received from the client) (step 104). (It was previously known to splice sockets of a computer for purposes of moving a task of handling all future communications on established session to the operating system kernel level to be handled by operating system.) The splicing by session management program 30 comprises the steps of performing a known operating system SPLICE request (which is a known ferature of AIX and LINUX operating systems). After the splicing, the operating system kernel within the proxy server 32 will automatically forward all subsequent requests received from the client in this session at the foregoing inbound socket of the proxy server to the foregoing outbound socket of the proxy server 32 (step 105). Consequently, such subsequent requests will rapidly proceed through the proxy server 32 to the destination server 36; preferably, the session management program 30 within the proxy server 32 will not be called in response to such subsequent requests. When the client sends a close request for this session (decision 108, yes branch), the operating system within the proxy server 32 will automatically forward this request to the destination server 36 (step 109). In response, the destination server will close the session within the destination server (i.e. terminate its assignment of its inbound and outbound sockets to this session and delete the session ID from its list of active sessions), and respond to the client 22 with an acknowledgment that the session has been closed. In response, the client 22 will close the session within the client, (i.e. terminate its assignment of its inbound and outbound sockets to this session and delete the session ID from its list of active sessions). In response to the acknowledgment from the destination server that the session has been closed, the operating system within the proxy server 32 will close the inbound and outbound sockets within the proxy server 32 that were previously assigned to this session and remove the splice (step 110).

Refer again to decision 46, no branch where there is an open request but no operational request or associated request parameters contained in the same message. In such case, the session management program 30 will check if the message that contained the open request also contains a close request (decision 52). If so, the session management program 30 will close the socket of the proxy server 32 on which the message was received (step 54). If not, then the session management program 30 will initiate a timer associated with the socket in the proxy server 32 through which the open request was received (step 55). The timer will define a time window during which the session management program 30 will wait for the requisite operational request and request parameters. Next, the session management program 30 spawns a socket monitoring program thread to monitor new messages arriving at this socket during the time window (step 60).

FIG. 2(C) illustrates the socket monitoring program thread in more detail. The socket monitoring program periodically performs an unblocking read operation from the socket by using a standard READ system call to the operating system (step 61). If a new message arrives at this socket during the time window, this socket monitoring program thread determines if the new message is to close the session (decision 62), as described above. If so, the socket monitoring program invokes step 54 to close the socket. However, if the new message contains an operational request and request parameters (decision 64, yes branch), then the socket monitoring program thread invokes steps 50, 51 and 52 to establish a session with the destination server 36, transfer the operational request and request parameters and splices the inbound and outbound sockets, as described above. If there is no close request or operational request or request parameters received at the socket within the time window (decision 68, no branch), then the socket monitoring program thread adds the identity of the socket to a delayed processing list (step 69) and initiates another timer for this socket (step 72). Also, the socket monitoring program invokes a delayed processing program function (step 74).

FIG. 2(D) illustrates in more detail the delayed processing program function 74 within the session management program 30. In step 200, the delayed processing program function identifies each entry on the delayed processing list. The delayed processing list contains the identity of each socket for which an open request was received but no operational request or request parameters has been received during the initial time window set in step 55. The list also contains a pointer to the second timer set in step 72 for the respective socket. For each of these entries on the list, the delayed processing program function monitors new messages arriving on the respective socket (step 202). This monitoring is performed by a standard TCP socket POLL function to check activity on selected sockets. If a new message arrives, the delayed processing program function determines if the message is a close request (decision 204). If so, then the delayed processing program function removes the socket ID from the delayed processing list (step 206) and invokes step 54 to close the respective inbound socket. If not, then the delayed processing program function determines if the message contains an operational request or request parameters (decision 208). If so, then the delayed processing program function removes the socket ID from the delayed processing list (step 210). Also, the delayed processing program function invokes steps 50, 51 and 52 to establish a session with the destination server 36, transfer the operational request and request parameters, and splices the inbound and outbound sockets, as described above. The delayed processing program function periodically checks the delayed processing list and associated timers to determine if any of the timers has expired (step 211). If so (decision 212, yes branch), then the delayed processing function deletes the socket ID from the delayed processing list (step 212), and then invokes step 54 to close the socket.

Based on the foregoing, a system, method and program product have been disclosed to manage sessions in accordance with the present invention. However, numerous modifications and substitutions can be made without deviating from the scope of the present invention. For example, application specific request and data analysis can be added as additional filtering criteria before establishing the session between the proxy server and the destination server. Therefore, the present invention has been disclosed by way of illustration and not limitation, and reference should be made to the following claims to determine the scope of the present invention.

The invention claimed is:

1. A method for managing sessions, the method comprising the steps of:
   a computer receiving an open request to open a session with a destination server;
   the computer determining if an operational request, associated with the open request, is received (i) in a same message in which the open request is received, or (ii) within a predetermined time after receiving the open request, and
      if so, the computer opening the session with the destination server and sending the operational request to the destination server, and
      if not, not opening the session with the destination server in response to the open request.

2. The method of claim 1 wherein the computer is a proxy server, the computer receives the operational request within a predetermined time after receipt of the open request, and in response, the destination server processing the operational request, wherein the operational request is one of a read data request and a write data request.

3. The method of claim 2 further comprising the steps of:
   the proxy server sending the open request and the operational request to the destination server; and
   the proxy server splicing an inbound socket of the proxy server associated with the session to an outbound socket of the proxy server associated with the session such that subsequent requests in this session are automatically passed from the inbound socket to the outbound socket, the outbound socket being used for the session with the destination server.

4. The method of claim 2 further comprising determining if a request to close the session is received in the same message in which the open request is received, and if not, initiating a timer to define a time window.

5. The method of claim 2 wherein the open request is received in the same message that also contains a request to close the session.

6. The method of as set forth in claim 1 further comprising the steps of:
   the computer determining if a request parameter associated with the open request is received (i) in a same message in which the open request is received, or (ii) within a predetermined time after the computer receiving the open request, and
   if so, the computer opening the session if not already open due to receipt by the computer of the operational request concurrently with the open request or within the predetermined time after receiving the open request, and
   if not, not opening the session if not already open due to receipt of the operational request concurrently with the open request or within the predetermined time after receiving the open request.

7. The method of claim 6 wherein the request parameter is an identification of a file to be read or written.

8. The method of claim 1 wherein an operational parameter associated with the operational request is received in the same message that the open request is received in.

9. A computer system for managing sessions, the computer system comprising:
   a CPU, a computer-readable tangible storage device and a computer-readable memory;
   first program instructions to receive an open request to open a session with a destination server;
   second program instructions to determine if an operational request, associated with the open request, is received (i) in a same message in which the open request is received, or (ii) within a predetermined time after receiving the open request, and
      if so, opening the session with the destination server and sending the operational request to the destination server, and
      if not, not opening the session with the destination server in response to the open request; and wherein
   the first program instructions and the second program instructions are stored in the computer-readable tangible storage device for execution by the CPU via the computer-readable memory.

10. The computer system of claim 9 wherein the first program instructions to receive an open request and the second program instructions to determine if an operational request is received are part of a proxy server, the operational request is received within a predetermined time after receipt of the open request, and in response, the destination server processing the operational request, wherein the operational request is one of a read data request and a write data request.

11. The computer system of claim 10 further comprising:
   third program instructions to send an open request and the operational request to the destination server; and
   fourth program instructions to splice an inbound socket of the proxy server associated with the session to an outbound socket of the proxy server associated with the session such that subsequent requests in this session are automatically passed from the inbound socket to the outbound socket, the outbound socket being used for the session with the destination server.

12. The computer system of claim 9 further comprising:
   third program instructions to determine if a request parameter associated with the open request is received (i) in a same message in which the open request is received, or (ii) within a predetermined time after receiving the open request, and
   if so, opening the session if not already open due to receipt of the operational request (i) in a same message in which the open request is received, or (ii) within the predetermined time after receiving the open request, and
   if not, not opening the session if not already open due to receipt of the operational request concurrently with the open request or within the predetermined time after receiving the open request.

13. The computer system of claim 12 wherein the request parameter is an identification of a file to be read or written.

14. A computer program product for managing sessions, the computer program product comprising:
   a computer-readable tangible storage device;
   first program instructions to receive an open request to open a session with a destination server;
   second program instructions to determine if an operational request, associated with the open request, is received (i) in a same message in which the open request is received, or (ii) within a predetermined time after receiving the open request, and
      if so, open the session with the destination server and sending the operational request to the destination server, and if not, not open the session with the destination server in response to the open request; and wherein the first and second program instructions are stored on the computer-readable tangible storage device.

15. The computer program product of claim 14 wherein the first and second program instructions are written to be performed by a proxy server, the operational request is received within a predetermined time after receipt of the open request, and in response, the destination server processing the operational request, wherein the operational request is one of a read data request and a write data request.

16. The computer program product of claim 15 further comprising:
   third program instructions to send an open request and the operational request to the destination server; and
   fourth program instructions to splice an inbound socket of the proxy server associated with the session to an outbound socket of the proxy server associated with the session such that subsequent requests in this session are automatically passed from the inbound socket to the outbound socket, the outbound socket being used for the session with the destination server; and wherein
   the third and fourth program instructions are stored on the computer-readable tangible storage device.

17. The computer program product of claim 14 further comprising:
   third program instructions to determine if a request parameter associated with the open request is received (i) in a same message in which the open request is received, or (ii) within a predetermined time after receiving the open request, and
   if so, open the session if not already open due to receipt of the operational request concurrently with the open request or within the predetermined time after receiving the open request, and
   if not, not open the session if not already open due to receipt of the operational request concurrently with the open request or within the predetermined time after receiving the open request; and wherein the third program instructions are stored on the computer-readable tangible storage device.

18. The computer program product of claim 17 wherein the request parameter is an identification of a file to be read or written.

19. A method for managing sessions at a proxy server, the method comprising the steps of:
   a computer receiving an open request to open a session with a destination server;
   the computer determining if an operational request, associated with the open request, is received at the proxy server (i) in a same message in which the open request is received, or (ii) within a predetermined time after receiving the open request, and
   if so, the computer sending to the destination server a request to open the session, and
   if not, not sending to the destination server a request to open the session in response to the open request.

20. The method of claim 19 wherein if the operational request is received at the proxy server (i) in the same message in which the open request is received, or (ii) within a predetermined time after receipt of the open request further comprising the step of automatically transferring subsequent requests in this session from an inbound socket of the proxy server to an outbound socket of the proxy server, wherein the outbound socket is assigned to the session with the destination server, wherein the operational request is one of a read data request and a write data request.

* * * * *